(12) United States Patent
Engebretsen et al.

(10) Patent No.: US 8,683,107 B2
(45) Date of Patent: *Mar. 25, 2014

(54) MEMORY MAPPED INPUT/OUTPUT BUS ADDRESS RANGE TRANSLATION

(71) Applicant: International Business Machines Corporation, Armonk, NY (US)

(72) Inventors: David R. Engebretsen, Cannon Falls, MN (US); Steven M. Thurber, Austin, TX (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/799,540

(22) Filed: Mar. 13, 2013

(65) Prior Publication Data

US 2013/0212308 A1  Aug. 15, 2013

Related U.S. Application Data

(63) Continuation of application No. 12/774,210, filed on May 5, 2010, now Pat. No. 8,429,323.

(51) Int. Cl.
G06F 13/36 (2006.01)
(52) U.S. Cl.
USPC ............................ 710/306; 710/305; 710/240
(58) Field of Classification Search
USPC ......... 710/305–306, 240–244, 200, 260–269, 710/316–317
See application file for complete search history.

(56) References Cited

U.S. PATENT DOCUMENTS

| | | | |
|---|---|---|---|
| 6,643,724 B2 | 11/2003 | Bauman et al. |
| 7,506,084 B2 | 3/2009 | Moerti et al. |
| 7,587,575 B2 | 9/2009 | Moertl et al. |
| 7,590,817 B2 | 9/2009 | Moertl et al. |
| 7,600,093 B2 | 10/2009 | Ben-Yehuda et al. |
| 7,979,592 B1 | 7/2011 | Pettey et al. |
| 8,316,169 B2 | 11/2012 | Armstrong et al. |
| 8,327,055 B2 | 12/2012 | Armstrong et al. |
| 8,364,879 B2 | 1/2013 | Armstrong et al. |
| 2006/0195617 A1 | 8/2006 | Arndt et al. |
| 2006/0195623 A1 | 8/2006 | Arndt et al. |
| 2007/0061549 A1 | 3/2007 | Kaniyur et al. |
| 2007/0067505 A1 | 3/2007 | Kaniyur et al. |
| 2007/0300241 A1 | 12/2007 | Prakash et al. |
| 2009/0037614 A1 | 2/2009 | Saripalli |
| 2009/0089464 A1 | 4/2009 | Lach et al. |
| 2009/0133016 A1 | 5/2009 | Brown et al. |
| 2009/0133028 A1 | 5/2009 | Brown et al. |
| 2009/0144731 A1 | 6/2009 | Brown et al. |
| 2010/0036995 A1 | 2/2010 | Nakayama et al. |
| 2011/0252170 A1 | 10/2011 | Armstrong et al. |

*Primary Examiner* — Ryan Stiglic
*Assistant Examiner* — Kim Huynh
(74) *Attorney, Agent, or Firm* — Owen J. Gamon; James R. Nock

(57) ABSTRACT

In an embodiment, a north chip receives a secondary bus identifier that identifies a bus that is immediately downstream from a bridge in a south chip, a subordinate bus identifier that identifies a highest bus identifier of all of buses reachable downstream of the bridge, and an MMIO bus address range that comprises a memory base and a memory limit. The north chip writes a translation of a bridge identifier and a south chip identifier to the secondary bus identifier, the subordinate bus identifier, and the MMIO bus address range. The north chip sends the secondary bus identifier, the subordinate bus identifier, the memory base, and the memory limit to the bridge. The bridge stores the secondary bus identifier, the subordinate bus identifier, the memory base, and the memory limit in the bridge.

14 Claims, 8 Drawing Sheets

ROUTING TABLE 145-1

| BRIDGE ID (409) | CHIP ID (410) | SECONDARY BUS ID (411) | SUBORDINATE BUS ID (412) | MMIO BAR (414) | |
|---|---|---|---|---|---|
| PTP A | CHIP C | BUS D | BUS D | 0X1000 - 0X1FFF | 401 |
| PTP B | CHIP C | BUS E | BUS E | 0X2000 - 0X2FFF | 402 |
| PTP C | CHIP D | BUS F | BUS F | 0X3000 - 0X3FFF | 403 |
| PTP D | CHIP D | BUS G | BUS G | 0X4000 - 0X4FFF | 404 |

FIG. 4

ROUTING TABLE 145-2

| BRIDGE ID (509) | CHIP ID (510) | SECONDARY BUS ID (511) | SUBORDINATE BUS ID (512) | MMIO BAR (514) | |
|---|---|---|---|---|---|
| PTP A | CHIP C | BUS D | BUS D | 0X1000 - 0X1FFF | 501 |
| PTP B | CHIP C | BUS E | BUS E | 0X3000 - 0X3FFF | 502 |
| PTP C | CHIP D | BUS F | BUS F | 0X4001 - 0X5000 | 503 |
| PTP D | CHIP D | BUS G | BUS G | 0X6000 - 0X9FFF | 504 |

FIG. 5

MEMORY MAPPED INPUT/OUTPUT BUS ADDRESS RANGE TRANSLATION

CROSS REFERENCE TO RELATED APPLICATION

This is a continuation application of U.S. patent application Ser. No. 12/774,210, filed May 5, 2010, to David R. Engebretsen, et al., entitled "MEMORY MAPPED INPUT/OUTPUT BUS ADDRESS RANGE TRANSLATION," which is herein incorporated by reference.

FIELD

An embodiment of the invention generally relates to computer systems and more particularly to MMIO (Memory Mapped Input/Output) bus address range translation for computer system buses.

BACKGROUND

Computer systems typically comprise a combination of computer programs and hardware, such as semiconductors, transistors, chips, and circuit boards. The hardware within a computer system is typically organized into components, such as processors, storage devices, and I/O (Input/Output) devices. These components typically communicate with each other via another component called a bus.

Buses can be parallel buses, which carry data words or multiple bits in parallel on multiple wires, or serial buses, which carry data in bit-serial form. A bus can be point-to-point, meaning that the bus connects only two components, or multi-drop, meaning that more than two components are connected to the bus. In a multi-drop bus, typically the bus has both data and address wires, and components connected to the bus listen for their unique destination address on the address wires, in order to discern whether data on the data wires is intended for them.

One example of a computer bus is called PCI EXPRESS (PERIPHERAL COMPONENT INTERCONNECT EXPRESS), which uses a network of point-to-point serial links. A pair of point-to-point PCI serial links make up a lane. A hub routes the lanes and acts as a crossbar switch. This dynamic point-to-point behavior allows more than one pair of devices to communicate with each other at the same time. This format also allows channel grouping, where multiple lanes are bonded to a single device pair in order to provide higher bandwidth.

PCI EXPRESS devices communicate via a logical connection called an interconnect or link. A link is a point-to-point communication channel between two PCI EXPRESS ports, allowing both to send/receive ordinary PCI-requests (e.g., configuration read/writes, I/O read/writes, and memory read/writes) and interrupts. At the physical level, a link comprises one or more lanes.

A lane comprises a transmit and a receive pair of differential lines. Each lane comprises four wires, meaning that, conceptually, each lane is a full-duplex byte stream, transporting packets containing the data in eight-bit byte format, between the two endpoints of a link, in both directions simultaneously. PCI EXPRESS transmissions send control messages, including interrupts, over the same links used for data.

One way of accessing memory via an I/O bus is via a technique called memory-mapped I/O (MMIO), in which a processor maps addresses in an I/O device into the processor's address space in memory. Areas of the processor's addressable space in memory are reserved for I/O to/from I/O devices. This reservation may be either temporary or permanent. Each I/O device monitors the bus and responds to any processor's read/write from/to the device-assigned address space in memory. Thus, if the processor issues a read instruction to the device-assigned address space in memory, the I/O device receives the instruction from the bus and transmits the data (onto the bus) that is located at the corresponding address within the I/O device. Similarly, if the processor issues a write instruction to the device-assigned address space in memory, the I/O device receives the data from the bus and writes it to the corresponding address within the I/O device. In some MMIO schemes, the processor instructions that read/write from/to the device-assigned address space in memory are the same instructions that read/write from/to memory in address spaces that are not reserved for I/O devices. In other MMIO schemes, the processor instructions that read/write from/to the device-assigned address space in memory are different instructions from those that read/write from/to memory in address spaces that are not reserved for I/O devices.

SUMMARY

A computer-readable storage medium and computer are provided. In an embodiment, a north chip receives a secondary bus identifier that identifies a bus that is immediately downstream from a bridge in a south chip, a subordinate bus identifier that identifies a highest bus identifier of all of buses reachable downstream of the bridge, and an MMIO bus address range that comprises a memory base and a memory limit. The north chip writes a translation of a bridge identifier and a south chip identifier to the secondary bus identifier, the subordinate bus identifier, and the MMIO bus address range. The north chip sends the secondary bus identifier, the subordinate bus identifier, the memory base, and the memory limit to the bridge. The bridge stores the secondary bus identifier, the subordinate bus identifier, the memory base, and the memory limit in the bridge.

BRIEF DESCRIPTION OF THE SEVERAL VIEWS OF THE DRAWINGS

FIG. 4 depicts a block diagram of an example data structure for a routing table, according to an embodiment of the invention.

FIG. 5 depicts a block diagram of an example data structure for another routing table, according to an embodiment of the invention.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
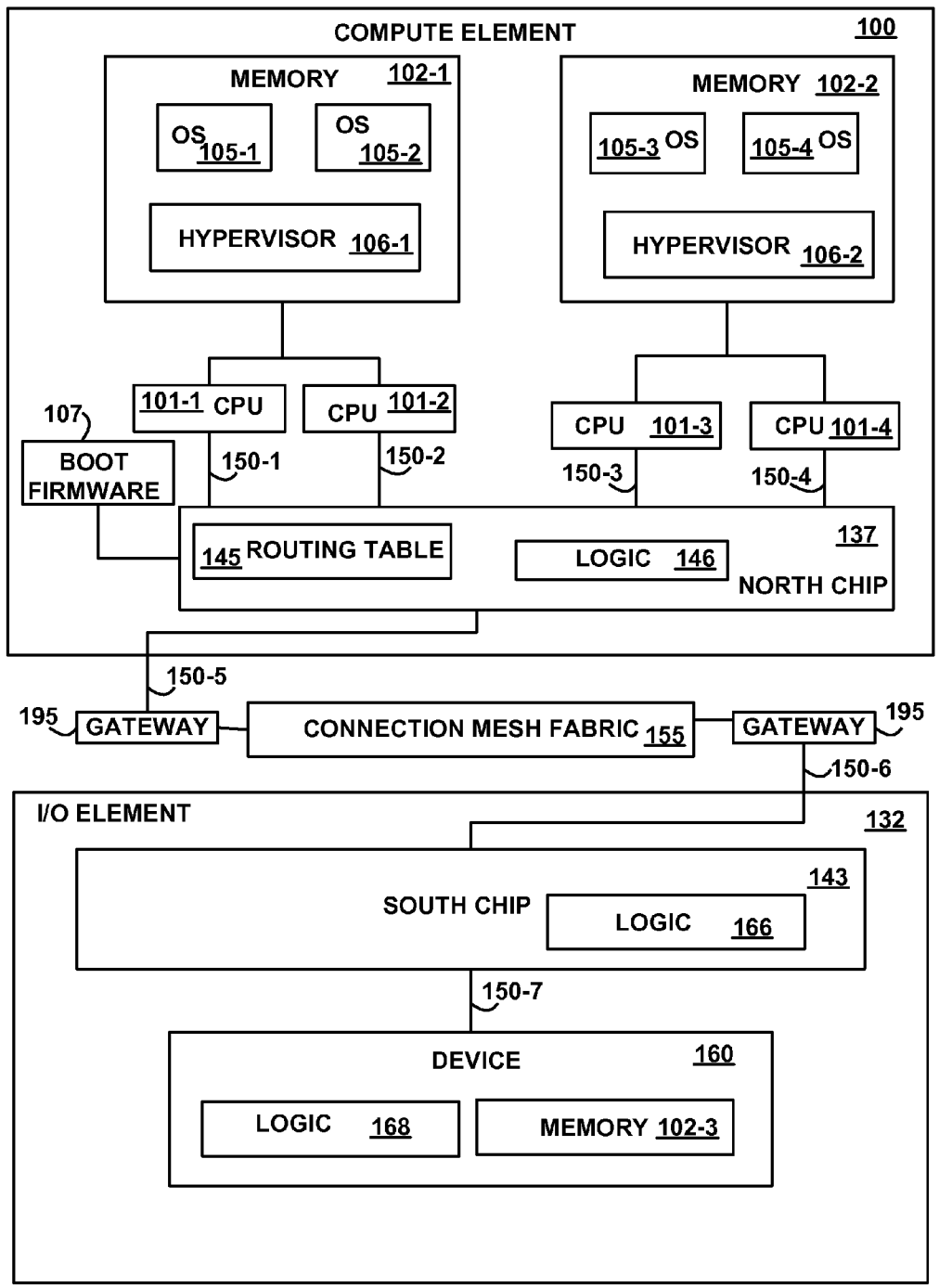
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system comprising the major components of a compute element 100 connected to an I/O (Input/Output) element 132 via gateways 195 and a connection mesh fabric 155.

The major components of the compute element 100 comprise memory 102-1, memory 102-2, central processing units (CPUs) 101-1, 101-2, 101-3, and 101-4, a north chip 137, and boot firmware 107. The CPUs 101-1 and 101-2 are connected to and share the memory 102-1, and the CPUs 101-3 and 101-4 are connected to and share the memory 102-2 via respective memory buses. The CPUs 101-1, 101-2, 101-3, and 101-4 are connected to the north chip 137 via respective buses 150-1, 150-2, 150-3, and 150-4. The CPUs 101-1, 101-2, 101-3, and 101-4 are also referred to herein as processors. The north chip 137 is connected to the connection mesh fabric 155 via a bus 150-5 and a gateway 195. The north chip 137 is also connected to the boot firmware 107 via a bus.

In various embodiments, the compute element 100 is a multi-user mainframe computer system, single-user computer system, or a server computer or similar electronic device that has little or no direct user interface, but receives requests from other computer systems (clients). In other embodiments, the compute element 100 is implemented as a desktop computer, a portable computer, a laptop or notebook computer, a tablet computer, a pocket computer, a telephone, a smart phone, a pager, an automobile, a teleconferencing system, an appliance, or any other appropriate type of electronic device.

Each processor executes instructions stored in the memory 102-1 or 102-2, and each processor may also include cache memory. The memories 102-1 and 102-2 store or encode respective operating systems 105-1, 105-2, 105-3, or 105-4, which, when executed on the respective processors, control the operations of the compute element 100. The memories 102-1 and 102-2 further store or encode respective hypervisors 106-1 and 106-2, which allocate resources to their respective operating systems 105-1, 105-2, 105-3, or 105-4.

The compute element 100 may use virtual addressing mechanisms that allow the programs of the compute element 100 to behave as if they only have access to a large, single storage entity instead of access to multiple, smaller storage entities. Thus, all portions of an operating system 105-1, 105-2, 105-3, or 105-4, and the hypervisors 106-1 or 106-2 are not necessarily completely stored in the same storage device at the same time.

In various embodiments, the north chip 137 is implemented as a chip, integrated circuit, circuit board, logic devices, memory, and/or a processor. The north chip 137 comprises a routing table 145 and logic 146. The routing table 145 is stored in memory or a storage device and comprises a translation, mapping, or assignment of bridge identifiers and chip identifiers to secondary bus identifiers, subordinate bus identifiers and MMIO bus address ranges, as further described below with reference to FIGS. 4 and 5. The logic 146 controls the operations of the north chip 137.

The boot firmware 107 is implemented as a chip, integrated circuit, circuit board, logic devices, and/or memory encoded with instructions that execute on a processor. The boot firmware logic 107 performs processing, operations, or functions, as further described below with reference to FIG. 6.

In an embodiment, the connection mesh fabric 155 comprises a point-to-point serial connection between the compute element 100 and the I/O element 132. In other embodiments, the connection mesh fabric 155 may be any suitable network or combination of networks and may support any appropriate protocol suitable for communication of data and/or code to/from the compute element 100 and the I/O element 132. In an embodiment, the connection mesh fabric 155 may be implemented via an Ethernet network, but in other embodiments any appropriate network or combination of networks implementing any appropriate protocol may be used.

In an embodiment, the connection mesh fabric 155 uses a different communications protocol than do the buses 150-5 and 150-6, and the gateways 195 are electronic components that join and translate between buses of different protocols. Although the gateways 195 as illustrated as separate from the compute element 100, the connection mesh fabric 155, and the I/O element 132, in other embodiments, the gateways 195 may be implemented as a component in the compute element 100, in the connection mesh fabric 155, or in the I/O element 132.

In various embodiments, the I/O element 132 is implemented as a system element, an electronic device, an endpoint, a computer, or a circuit board. The I/O element 132 comprises a south chip 143 connected to the connection mesh fabric 155 via a bus 150-6 and a gateway 195. The south chip 143 is further connected to a device 160 via a bus 150-7. The south chip 143 is implemented as a chip, integrated circuit, circuit board, logic devices, memory, and/or a processor. In an embodiment, the south chip 143 is identical to the north chip 137, but the chips 137 and 143 perform different functions depending on whether they are located on the compute element 100 or the I/O element 132. In another embodiment, the chips 137 and 143 are different, and each is customized for its respective element.

The south chip 143 comprises logic 166. In an embodiment, the device 160 comprises a storage device or a combination of storage devices, either connected within the I/O element 132 or connected directly or indirectly to the I/O element 132. In another embodiment, the device 160 comprises a network adapter, I/O adapter, or I/O processor that connects to a communications network. Although the device 160 is illustrated as being contained within the I/O element 132, in another embodiment, the device 160 is separate from and connected to the I/O element 132. The device 160 comprises logic 168 and memory 102-3, which the compute element 100 may access via MMIO commands, requests, or operations sent to the device 160 via the connection mesh fabric 155, the gateways 195, and the south chip 143.

In an embodiment, the logic 146, 166, and 168 are implemented as chips, circuits, and/or logic devices. In another embodiment, the logic 146, 166, and/or 168 comprise memory encoded with instructions or statements and a processor on which the instructions or statements execute or are interpreted. The logic 146, 166, and 168 perform processing, operations, or functions, as further described below with reference to FIGS. 6, 7, 8, and 9.

Although the buses 150-1, 150-2, 150-3, 150-4, 150-5, 150-6, and 150-7 are shown in FIG. 1 as relatively simple, single bus structures providing direct communication paths, in fact the buses 150-1, 150-2, 150-3, 150-4, 150-5, 150-6, and 150-7 may comprise multiple different buses or communication paths, which may be arranged in any of various forms, such as point-to-point links in hierarchical, star or web configurations, multiple hierarchical buses, parallel and redundant paths, or any other appropriate type of configuration. In an embodiment, the buses 150-1, 150-2, 150-3, and 150-4, 150-5, 150-6, and 150-7 are point-to-point serial buses, such as the PCI EXPRESS bus, but in other embodiments, any appropriate bus may be used. Furthermore, buses 150-1, 150-2, 150-3, 150-4, 150-5, 150-6, and 150-7 may comprise memory buses, I/O buses, I/O bus interface units, I/O processors, or any multiple and/or combination thereof.

In various embodiments, the memory 102-1, 102-2, and 102-3 are random-access semiconductor memory, storage devices, non-volatile memory, volatile memory, disk drives, or storage mediums for storing or encoding data and programs. The memory 102-1, 102-2, and 102-3 are conceptually single monolithic entities, but in other embodiments the memory 102-1, 102-2, and 102-3 are more complex arrangements, such as hierarchies of caches and/or other memory devices. For example, the memory 102-1, 102-2, and 102-3 may exist in multiple levels of memory devices of varying sizes and speeds.

It should be understood that FIG. 1 is intended to depict the representative major components of the compute elements 100, the connection mesh fabric 155, the gateways 195, and the I/O elements 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the compute element 100, the I/O element 132, and/or the device 160 and that, when read and executed by one or more processors in the compute element 100, the I/O element 132, and/or the device 160 or when interpreted by instructions that are executed by one or more processors, cause the compute element 100, I/O element 132, and/or the device 160 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device. Examples of computer-readable storage media include the memory 102-1, 102-2, and 102-3.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to the compute element 100, the I/O element 132, and/or the device 160 via a variety of tangible computer-readable storage media that may be operatively or communicatively connected (directly or indirectly) to the processor or processors.

The computer program instructions may also be loaded onto a computer, the compute element 100, the I/O element 132, and/or the device 160, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring the compute element 100, the I/O element 132, and/or the device 160 to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, compute elements, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
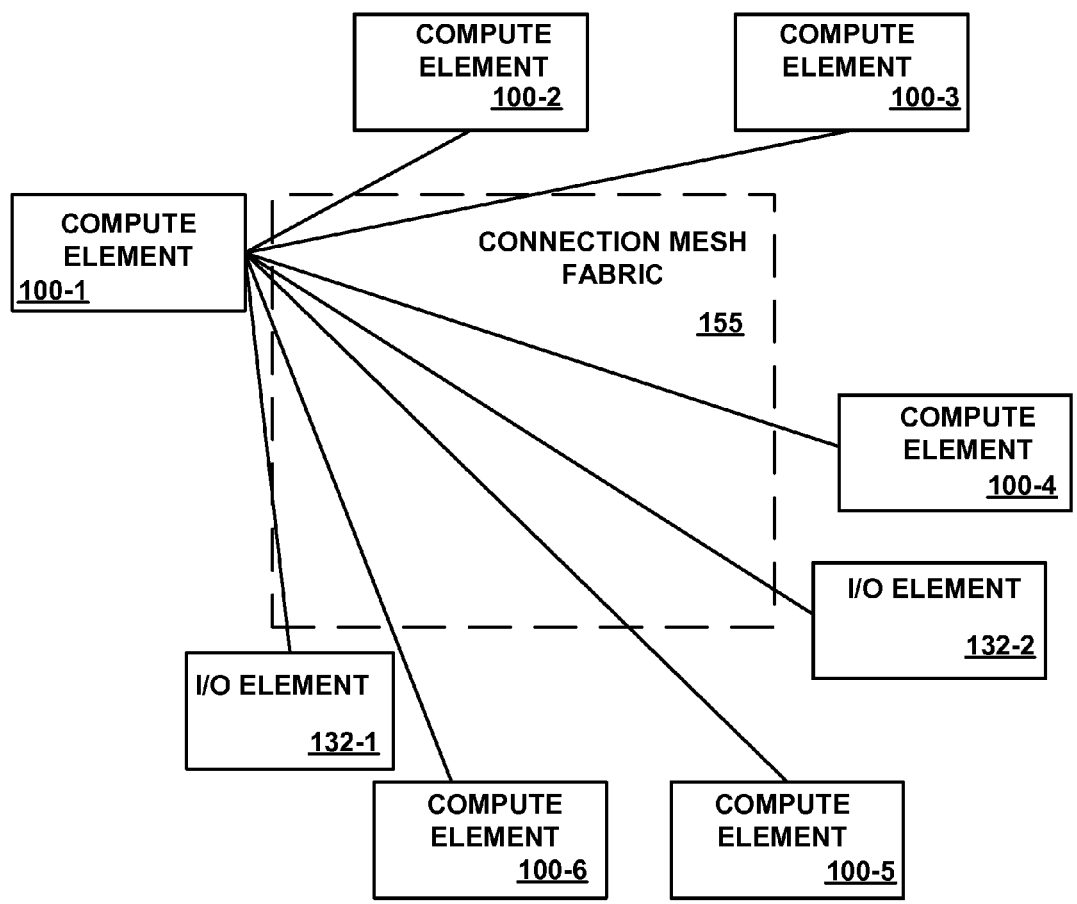
FIG. 2 depicts a block diagram illustrating selected components of an embodiment of the invention.

FIG. 2 depicts a block diagram illustrating the interaction of selected components of an embodiment of the invention. The compute elements 100-1, 100-2, 100-3, 100-4, 100-5, and 100-6, and the I/O elements 132-1 and 132-2 are connected via the connection mesh fabric 155 and the gateways 195 (FIG. 1). The compute elements 100-1, 100-2, 100-3, 100-4, 100-5, and 100-6 are examples of, and are generically referred to by, the compute element 100 (FIG. 1). The I/O elements 132-1 and 132-2 are examples of, and are generically referred to by, the I/O element 132 (FIG. 1).

The connection mesh fabric 155 comprises serial point-to-point links. For convenience of illustration, FIG. 2 depicts compute element 100-1 as connected to every other compute and I/O element 100-2, 100-3, 100-4, 100-5, 100-6, 132-1, and 132-2. But, all compute elements 100 and I/O elements 132 are connected to each and every other compute element 100 and I/O element 132 via high speed point-to-point links in an interconnection of everything-to-everything, which is referred to as the connection mesh fabric 155. Thus, if one point-to-point link fails, elements may still communicate to each other by hopping though another element. In an embodiment, the connection mesh fabric 155 is not necessarily confined to a single chassis or rack, but may span multiple chassis or racks.

In a serial communication link, data is sent one bit at a time, sequentially over a single channel, wire, or bus. Serial communication is in contrast to parallel communication, where several bits are sent together, on a link with several parallel channels or wires.

Figure 3:
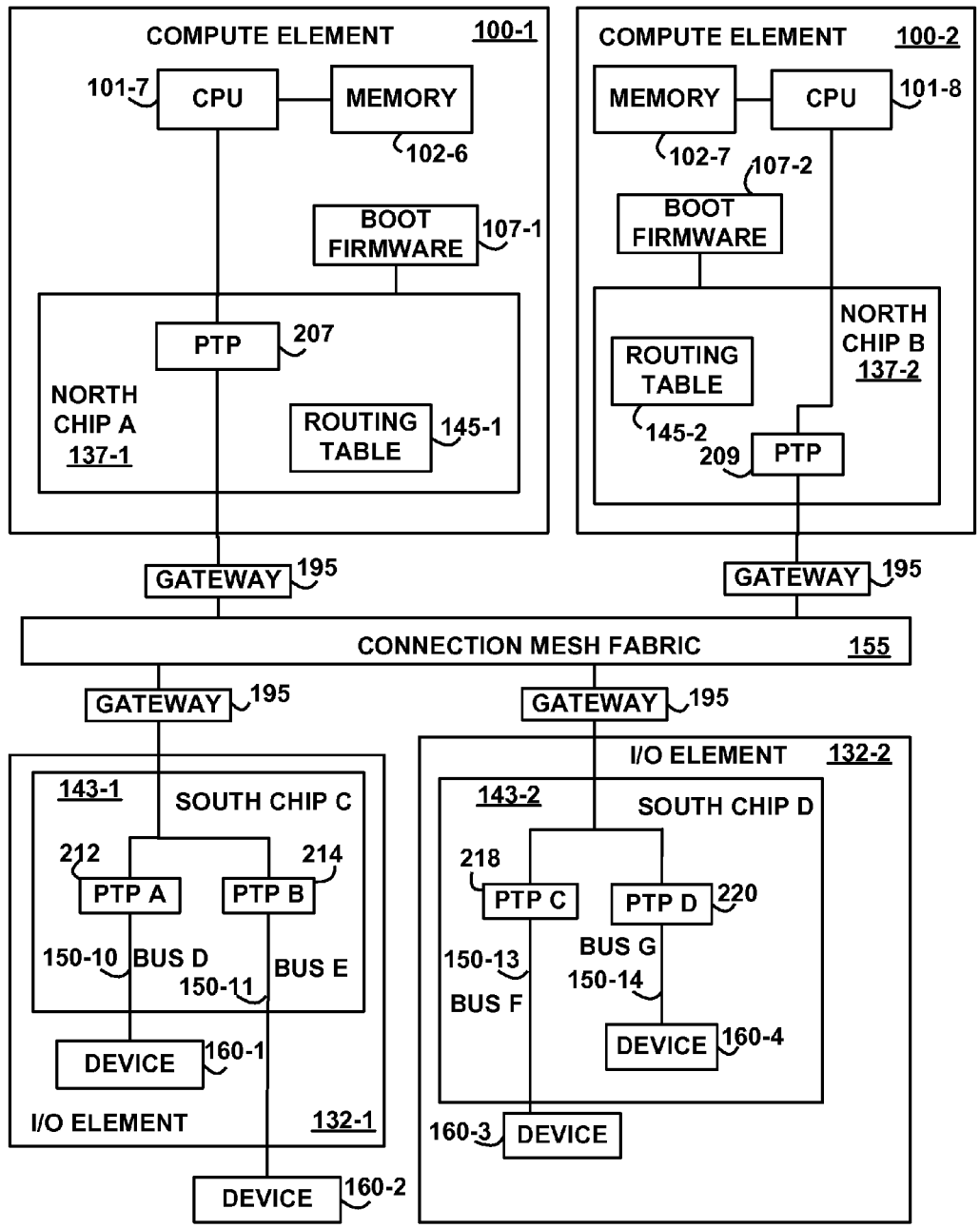
FIG. 3 depicts a block diagram illustrating more detail of selected components of an embodiment of the invention.

FIG. 3 depicts a block diagram illustrating more detail of selected components of an embodiment of the invention. As illustrated in FIG. 3, the compute elements 100-1 and 100-2 are connected via the gateways 195 and the connection mesh fabric 155 to the I/O elements 132-1 and 132-2.

The compute element 100-1 comprises a CPU 101-7 connected via a bus to a PTP (PCI to PCI) bridge 207 in a north chip 137-1. The CPU 101-7 is further connected via a bus to the memory 102-6. The north chip 137-1 is further connected to the boot firmware 107-1. The boot firmware 107-1 is an example of, and is generically referred to by, the boot firmware 107 (FIG. 1). The CPU 101-7 is an example of the CPUs 101-1, 101-2, 101-3, or 101-4 (FIG. 1). A bridge is an electronic component that forwards packets of data between two different networks, different segments of networks, or different buses that use the same communications protocol, based on a destination address in the packet. Although an embodiment of the invention is described in the context of the PCI EXPRESS bus protocol, in other embodiments any appropriate bus protocol may be used. The memory 102-6 is an example of the memory 102-1 or 102-2.

The north chip 137-1 comprises a PTP bridge 207, meaning that both the ingress and egress buses that are connected to respective ingress and egress ports of the PTP bridge 207 are the same type of bus using the same protocol, such as in an embodiment, both being PCI buses. The north chip 137-1 further comprises a routing table 145-1, which is an example of, and is generically referred to by, the routing table 145 (FIG. 1). The north chip 137-1 is an example of, and is generically referred to by, the north chip 137 (FIG. 1).

The compute element 100-2 comprises a CPU 101-8 connected via a bus to a PTP bridge 209 in a north chip 137-2. The CPU 101-8 is further connected via a bus to memory 102-7. The north chip 137-2 is further connected to the boot firmware 107-2. The boot firmware 107-2 is an example of, and is generically referred to by, the boot firmware 107 (FIG. 1). The CPU 101-8 is an example of the CPUs 101-1, 101-2, 101-3, or 101-4 (FIG. 1). The memory 102-7 is an example of the memory 102-1 or 102-2.

The north chip 137-2 comprises the PTP (PCI to PCI) bridge 209, meaning that both the ingress and the egress bus that are connected to respective ingress and egress ports of the PTP bridge 209 communicate via the same bus protocol, such as in an embodiment both being PCI buses. The north chip 137-2 further comprises a routing table 145-2, which is an example of, and is generically referred to by, the routing table 145 (FIG. 1). The north chip 137-2 is an example of, and is generically referred to by, the north chip 137 (FIG. 1).

The I/O element 132-1 comprises a south chip 143-1 connected to devices 160-1 and 160-2 via respective buses 150-10 (named "Bus D") and 150-11 (named "Bus E"). The south chip 143-1 comprises a PTP bridge 212 and a PTP bridge 214. Each of the PTP bridge 212 and PTP bridge 214 comprises a respective ingress port, which is connected to the connection mesh fabric 155 via an ingress bus and a gateway 195. The ingress port is a receiving port, meaning that the PTP bridge receives signals from the gateway 195 via the ingress port and ingress bus. Each of the PTP bridge 212 and the PTP bridge 214 further comprises a respective egress port, which is connected to respective devices 160-1 and 160-2 via respective egress buses 150-10 and 150-11.

An egress port is a transmitting port, meaning that the PTP bridge transmits signals on a bus to a device via an egress port. In an embodiment, the buses 150-10 and 150-11 are point-to-point serial buses, such as the PCI EXPRESS bus, but in other embodiments, any appropriate bus may be used. In an embodiment, a single port may act as an ingress port at one time while data is being transmitted in one direction and an egress port at other time at another time while data is being transmitted in the other direction. In another embodiment, a single port only acts as an ingress or an egress port, and multiple ports are present, in order to provide bi-directional data transfer (both from a compute element 100 to a device 160 and from a device 160 to a compute element 100).

The I/O element 132-2 comprises a south chip 143-2 connected to devices 160-3 and 160-4 via respective buses 150-13 and 150-14. The south chip 143-2 comprises a PTP bridge 218 and a PTP bridge 220. Each of the PTP bridge 218 and the PTP bridge 220 comprises an ingress port, which is connected to the connection mesh fabric 155 via an ingress bus and a gateway 195. Each of the PTP bridge 218 and the PTP bridge 220 further comprises an egress port, which is connected to respective devices 160-3 and 160-4 via respective egress buses 150-13 (named "Bus F") and 150-14 (named "Bus G"). In an embodiment, the egress buses 150-13 and 150-14 are point-to-point serial buses, such as the PCI EXPRESS bus, but in other embodiments, any appropriate bus may be used.

The devices 160-1, 160-2, 160-3, and 160-4 are examples of, and are generically referred to by, the device 160 (FIG. 1). Each of the devices 160-1, 160-2, 160-3, and 160-4 stores or encodes in its memory a respective MMIO address range. These MMIO addresses ranges may be different for different compute elements or operating systems, meaning that a different compute element or operating system may access the same memory location within a device 160 via a different ranges of MMIO addresses.

FIG. 4 depicts a block diagram of an example data structure for a routing table 145-1, according to an embodiment of the invention. The routing table 145-1 comprises example rows 401, 402, 403, and 404, each of which includes a bridge identifier field 409, a south chip identifier field 410, a secondary bus identifier field 411, a subordinate bus identifier field 412, and an MMIO bus address range field 414.

The MMIO bus address range field 414 specifies a range or extent of MMIO addresses that the compute element 100-1 may use to address or access the memory of a device or devices 160 that are downstream from the PTP bridge (identified by the value in the bridge identifier field 409 in the same row) in a south chip 143 (identified by the value in the south chip identifier 410 in the same row). Thus, the MMIO bus address range assigned to a PTP bridge is the range of MMIO addresses that are assigned and addressable to devices downstream from that PTP bridge. The downstream device or devices 160 are connected to the PTP bridge 409 via a bus or buses whose bus identifiers are encompassed by, or are within, the bus range specified by the secondary bus identifier 411 and the subordinate bus identifier 412, in the same row. The secondary bus identifier 411 identifies the first bus that is immediately downstream from the PTP bridge 409 and that connects to the PTP bridge 409. The subordinate bus identifier 412 specifies the highest (largest) bus identifier of all of the buses that can be reached downstream of the bridge 409. In various embodiments, buses that can be reached (are reachable) downstream of the bridge 409 are connected directly to the PTP bridge 409 or indirectly through other bridges. Downstream refers to a relative physical position of a component (either a bus or a device) that is farther from the compute element 100-1 than is the relative position of a component that is upstream, or nearer the compute element 100-1. Using the example of FIG. 3, the device 160-1 is downstream from the PTP bridge A 212, and the PTP bridge A 212 is upstream from the device 160-1 because the device 160-1 is farther from the compute element 100-1 than is the PTP bridge A 212.

Referring again to FIG. 4, in the example routing table 145-1, each row 401, 402, 403 and 404 has identical respective secondary bus identifiers 411 and subordinate bus identifiers 412 because, in the example of FIG. 3, each PTP bridge 212, 214, 218, and 220 only has one downstream bus (the respective buses 150-10, 150-11, 150-13, and 150-14). But, in other embodiments, the I/O elements may include a hierarchy of PTP bridges, in which a particular bridge has multiple downstream bridges and/or buses.

The MMIO bus address range field 414 specifies a beginning (lower bound or memory base) of the range and an end (upper bound or memory limit) of the range. The memory base is less than the memory limit. The values in the MMIO bus address range field 414 are unique within the compute element 100-1 that assigns them, but are not necessarily unique within a south chip 143 or across all south chips 143. That is, multiple devices 160 connected to the same south chip 143 may have the same values or overlapping range values in their respective MMIO bus address range fields (in different routing tables 145 in different north chips 137) if those values were assigned by different compute elements 100. Further, multiple devices 160 connected to different south chips 143 may have the same values or overlapping range values in their respective MMIO bus address range fields (in different routing tables 145 in different north chips 137) if those values were assigned by different compute elements 100. Range values overlap if the memory base of one range is between the memory base and memory limit of another range. Also, range values overlap if the memory limit of one range is between the memory base and memory limit of another range.

Thus, the routing table 145-1 represents a mapping or translation of MMIO bus address ranges 414, secondary bus identifiers 411, and subordinate bus identifiers 412 used by the compute element 100-1 to bridge identifiers 409 that identify PTP bridges that are contained within south chips identified by the chip identifiers 410. Thus, the MMIO bus address range 414, the secondary bus identifier 411, and the subordinate bus identifier 412 are assigned to the bridge identifier 409 and the south chip identifier 410 in the same row. The assignment of the MMIO bus address range 414, the secondary bus identifier 411, and the subordinate bus identifier 412 to the bridge identifier 409 and the south chip identifier 410 is unique within a routing table, meaning that no two rows in a routing table contain the same or overlapping MMIO bus address ranges 414.

The example row 401 in the routing table 145-1 comprises data that indicates that the south chip 143-1 identified by the value "Chip C" in the south chip identifier field 410 comprises a PTP bridge identified by the value "PTP A" in the bridge identifier field 409 that is assigned a secondary bus identifier 411 of "Bus D," a subordinate bus identifier 412 of "Bus D," and an MMIO bus address range 414 of 0-1000-0x1FFF.

A device 160 is connected to the bridge 409 of "PTP A" via a bus whose bus identifier is encompassed by or falls within the range of bus identifiers specified by the secondary bus identifier 411 of "Bus D" and the subordinate bus identifier 412 of "Bus D." The bridge identified by the bridge identifier 409 of "PTP A" forwards configuration commands that specify a bus identifier encompassed by the range of the secondary bus identifier 411 of "Bus D" and the subordinate bus identifier 412 of "Bus D" to the buses, bridges, and devices that are downstream from the bridge "PTP A." The bridge identified by the bridge identifier 409 of "PTP A" forwards MMIO commands that specify an MMIO address encompassed by the MMIO bus address range 414 of 0x1000-0x1FFF to the buses, bridges, and devices that are downstream from the bridge "PTP A."

Thus, in response to the CPU 101-7 (in the same compute element 100-1 that comprises the north chip 137-1 that comprises the routing table 145-1) issuing a read/write command from/to a MMIO address within or encompassed by the range of 0x1000 through 0x1FFF, the north chip 137-1 finds the MMIO bus address range 414 in the row 401 that encompasses the MMIO address specified by the read/write command and sends the read/write command to the device 160-1 that is connected via the Bus D to the bridge PTP A in the south chip C 143-1.

The example row 402 in the routing table 145-1 comprises data that indicates that the south chip 143-1 identified by the value "Chip C" in the south chip identifier field 410 comprises a PTP bridge identified by the value "PTP B" in the bridge identifier field 409 that is assigned a secondary bus identifier 411 of "Bus E," a subordinate bus identifier 412 of "Bus E," and an MMIO bus address range 414 of 0x2000-0x2FFF.

A device 160 is connected to the bridge 409 of "PTP B" via a bus whose bus identifier is encompassed by or falls within the range of bus identifiers specified by the secondary bus identifier 411 of "Bus E" and the subordinate bus identifier 412 of "Bus E." The bridge identified by the bridge identifier 409 of "PTP B" forwards configuration commands that specify a bus identifier encompassed by the range of the secondary bus identifier 411 of "Bus E" and the subordinate bus identifier 412 of "Bus E" to the buses, bridges, and devices that are downstream from the bridge "PTP B." The bridge identified by the bridge identifier 409 of "PTP B" forwards MMIO commands that specify an MMIO address encompassed by the MMIO bus address range 414 of 0x2000-0x2FFF to the buses, bridges, and devices that are downstream from the bridge "PTP B."

Thus, in response to the CPU 101-7 (in the same compute element 100-1 that comprises the north chip 137-1 that comprises the routing table 145-1) issuing a read/write command from/to a MMIO address within or encompassed by the range of 0x2000 through 0x2FFF, the north chip 137-1 finds the MMIO bus address range 414 in the row 402 that encompasses the MMIO address specified by the read/write command and sends the read/write command to the device 160-2 that is connected via the Bus E to the bridge PTP B in the south chip C 143-1.

The example row 403 in the routing table 145-1 comprises data that indicates that the south chip 143-2 identified by the value "Chip D" in the south chip identifier field 410 comprises a PTP bridge identified by the value "PTP C" in the bridge identifier field 409 that is assigned a secondary bus identifier 411 of "Bus F," a subordinate bus identifier 412 of "Bus F," and an MMIO bus address range 414 of 0x3000-0x3FFF.

A device 160 is connected to the bridge 409 of "PTP C" via a bus whose bus identifier is encompassed by or falls within the range of bus identifiers specified by the secondary bus identifier 411 of "Bus F" and the subordinate bus identifier 412 of "Bus F." The bridge identified by the bridge identifier 409 of "PTP C" forwards configuration commands that specify a bus identifier encompassed by the range of the secondary bus identifier 411 of "Bus F" and the subordinate bus identifier 412 of "Bus F" to the buses, bridges, and devices that are downstream from the bridge "PTP C." The bridge identified by the bridge identifier 409 of "PTP C" forwards MMIO commands that specify an MMIO address encompassed by the MMIO bus address range 414 of 0x3000-0x3FFF to the buses, bridges, and devices that are downstream from the bridge "PTP C."

Thus, in response to the CPU 101-7 (in the same compute element 100-1 that comprises the north chip 137-1 that comprises the routing table 145-1) issuing a read/write command from/to a MMIO address within or encompassed by the range of 0x3000 through 0x3FFF, the north chip 137-1 finds the MMIO bus address range 414 in the row 403 that encompasses the MMIO address specified by the read/write command and sends the read/write command to the device 160-3 that is connected via the Bus F to the bridge PTP C in the south chip D 143-2.

The example row 404 in the routing table 145-1 comprises data that indicates that the south chip 143-2 identified by the value "Chip D" in the south chip identifier field 410 comprises a PTP bridge identified by the value "PTP D" in the bridge identifier field 409 that is assigned a secondary bus identifier 411 of "Bus G," a subordinate bus identifier 412 of "Bus G," and an MMIO bus address range 414 of 0x4000-0x4FFF.

A device 160 is connected to the bridge 409 of "PTP D" via a bus whose bus identifier is encompassed by or falls within the range of bus identifiers specified by the secondary bus identifier 411 of "Bus G" and the subordinate bus identifier 412 of "Bus G." The bridge identified by the bridge identifier 409 of "PTP D" forwards configuration commands that specify a bus identifier encompassed by the range of the secondary bus identifier 411 of "Bus G" and the subordinate bus identifier 412 of "Bus G" to the buses, bridges, and devices that are downstream from the bridge "PTP D." The bridge identified by the bridge identifier 409 of "PTP D" forwards MMIO commands that specify an MMIO address encompassed by the MMIO bus address range 414 of 0x4000-0x4FFF to the buses, bridges, and devices that are downstream from the bridge "PTP D."

Thus, in response to the CPU 101-7 (in the same compute element 100-1 that comprises the north chip 137-1 that comprises the routing table 145-1) issuing a read/write command from/to a MMIO address within or encompassed by the range of 0x4000 through 0x4FFF, the north chip 137-1 finds the MMIO bus address range 414 in the row 404 that encompasses the MMIO address specified by the read/write command and sends the read/write command to the device 160-4 that is connected via the Bus G to the bridge PTP D in the south chip D 143-2.

FIG. 5 depicts a block diagram of an example data structure for a routing table 145-2, according to an embodiment of the invention. The routing table 145-2 comprises example rows 501, 502, 503, and 504, each of which includes a bridge identifier field 509, a south chip identifier field 510, a secondary bus identifier field 511, a subordinate bus identifier field 512, and an MMIO bus address range field 514.

The MMIO bus address range field 514 specifies a range or extent of MMIO addresses that the compute element 100-2 may use to address the memory of a device or devices 160 that are downstream from the PTP bridge (identified by the value in the bridge identifier field 509 in the same row) in a south chip 143 (identified by the value in the south chip identifier 510 in the same row). The downstream device or devices 160 are connected to the PTP bridge 509 via a bus or buses whose bus identifiers are encompassed by, or are within, the bus range specified by the secondary bus identifier 511 and the subordinate bus identifier 512, in the same row. The secondary bus identifier 511 identifies the bus immediately downstream from the PTP bridge 509. The subordinate bus identifier 512 specifies the highest bus identifier of all of the buses that can be reached downstream of the bridge 509. Downstream refers to a relative physical position of a component (either a bus or a device) that is farther from the compute element 100-2 than is the relative position of a component that is upstream, or nearer the compute element 100-2. Using the example of FIG. 3, the device 160-3 is downstream from the PTP bridge C 218, and the PTP bridge C 218 is upstream from the device 160-3 because the device 160-3 is farther from the compute element 100-2 than is the PTP bridge C 218.

Referring again to FIG. 5, in the example routing table 145-2, each row 501, 502, 503 and 504 has identical respective secondary bus identifiers 511 and subordinate bus identifiers 512 because, in the example of FIG. 3, each PTP bridge 212, 214, 218, and 220 only has one downstream bus (the respective buses 150-10, 150-11, 150-13, and 150-14). But, in other embodiments, the I/O elements may include a hierarchy of PTP bridges, in which a particular bridge has multiple downstream bridges and/or buses. The MMIO bus address range field 514 specifies a beginning (lower bound or memory base) of the range and an end (upper bound or memory limit) of the range. The memory base is less than the memory limit.

The values in the MMIO bus address range field 514 are unique within the compute element 100-2 that assigns them, but are not necessarily unique within a south chip 143 or across all south chips 143. That is, multiple devices 160 connected to the same south chip 143 may have the same values or overlapping range values in their respective MMIO bus address range fields (in different routing tables 145 in different north chips 137) if those values were assigned by different compute elements 100. Further, multiple devices 160 connected to different south chips 143 may have the same values or overlapping range values in their respective MMIO bus address range fields (in different routing tables 145 in different north chips 137) if those values were assigned by different compute elements 100. Range values overlap if the memory base of one range is between the memory base and memory limit of another range. Also, range values overlap if the memory limit of one range is between the memory base and memory limit of another range.

Thus, the routing table 145-2 represents a mapping or translation of MMIO bus address ranges 514, secondary bus identifiers 511, and subordinate bus identifiers 512 used by the compute element 100-2 to bridge identifiers 509 that identify PTP bridges that are contained within south chips identified by the chip identifiers 510. Thus, the MMIO bus address range 514, the secondary bus identifier 511, and the subordinate bus identifier 512 are assigned to the bridge identifier 509 and the south chip identifier 510 in the same row. The assignment of the MMIO bus address range 514, the secondary bus identifier 511, and the subordinate bus identifier 512 to the bridge identifier 509 and the south chip identifier 510 is unique within a routing table, meaning that no two rows in a routing table contain the same or overlapping MMIO bus address ranges 514.

The example row 501 in the routing table 145-2 comprises data that indicates that the south chip 143-1 identified by the value "Chip C" in the south chip identifier field 510 comprises a PTP bridge identified by the value "PTP A" in the bridge identifier field 509 that is assigned a secondary bus identifier 511 of "Bus D," a subordinate bus identifier 512 of "Bus D," and an MMIO bus address range 514 of 0x1000-0x1FFF.

A device 160 is connected to the bridge 509 of "PTP A" via a bus whose bus identifier is encompassed by or falls within the range of bus identifiers specified by the secondary bus identifier 511 of "Bus D" and the subordinate bus identifier 512 of "Bus D." The bridge identified by the bridge identifier 509 of "PTP A" forwards configuration commands that specify a bus identifier encompassed by the range of the secondary bus identifier 511 of "Bus D" and the subordinate bus identifier 512 of "Bus D" to the buses, bridges, and devices that are downstream from the bridge "PTP A." The bridge identified by the bridge identifier 509 of "PTP A" forwards MMIO commands that specify an MMIO address encompassed by the MMIO bus address range 514 of 0x1000-0x1FFF to the buses, bridges, and devices that are downstream from the bridge "PTP A."

Thus, in response to the CPU 101-8 (in the same compute element 100-2 that comprises the north chip 137-2 that comprises the routing table 145-2) issuing a read/write command from/to a MMIO address within or encompassed by the range of 0x1000 through 0x1FFF, the north chip 137-2 finds the MMIO bus address range 514 in the row 501 that encompasses the MMIO address specified by the read/write command and sends the read/write command to the device 160-1 that is connected via the Bus D to the bridge PTP A in the south chip C 143-1.

The example row 502 in the routing table 145-2 comprises data that indicates that the south chip 143-1 identified by the value "Chip C" in the south chip identifier field 510 comprises a PTP bridge identified by the value "PTP B" in the bridge identifier field 509 that is assigned a secondary bus identifier 511 of "Bus E," a subordinate bus identifier 512 of "Bus E," and an MMIO bus address range 514 of 0x3000-0x3FFF.

A device 160 is connected to the bridge 509 of "PTP B" via a bus whose bus identifier is encompassed by or falls within the range of bus identifiers specified by the secondary bus identifier 511 of "Bus E" and the subordinate bus identifier 512 of "Bus E." The bridge identified by the bridge identifier 509 of "PTP B" forwards configuration commands that specify a bus identifier encompassed by the range of the secondary bus identifier 511 of "Bus E" and the subordinate bus identifier 512 of "Bus E" to the buses, bridges, and devices that are downstream from the bridge "PTP B." The bridge identified by the bridge identifier 509 of "PTP B" forwards MMIO commands that specify an MMIO address encompassed by the MMIO bus address range 514 of 0x3000-0x3FFF to the buses, bridges, and devices that are downstream from the bridge "PTP B."

Thus, in response to the CPU 101-8 (in the same compute element 100-2 that comprises the north chip 137-2 that comprises the routing table 145-2) issuing a read/write command from/to a MMIO address within or encompassed by the range of 0x3000 through 0x3FFF, the north chip 137-2 finds the MMIO bus address range 514 in the row 502 that encompasses the MMIO address specified by the read/write command and sends the read/write command to the device 160-2 that is connected via the Bus E to the bridge PTP B in the south chip C 143-1.

The example row 503 in the routing table 145-2 comprises data that indicates that the south chip 143-2 identified by the value "Chip D" in the south chip identifier field 510 comprises a PTP bridge identified by the value "PTP C" in the bridge identifier field 509 that is assigned a secondary bus identifier 511 of "Bus F," a subordinate bus identifier 512 of "Bus F," and an MMIO bus address range 514 of 0x4001-0x5000.

A device 160 is connected to the bridge 509 of "PTP C" via a bus whose bus identifier is encompassed by or falls within the range of bus identifiers specified by the secondary bus identifier 511 of "Bus F" and the subordinate bus identifier 512 of "Bus F." The bridge identified by the bridge identifier 509 of "PTP C" forwards configuration commands that specify a bus identifier encompassed by the range of the secondary bus identifier 511 of "Bus F" and the subordinate bus identifier 512 of "Bus F" to the buses, bridges, and devices that are downstream from the bridge "PTP C." The bridge identified by the bridge identifier 509 of "PTP C" forwards MMIO commands that specify an MMIO address encompassed by the MMIO bus address range 514 of 0x4001-0x5000 to the buses, bridges, and devices that are downstream from the bridge "PTP C."

Thus, in response to the CPU 101-8 (in the same compute element 100-2 that comprises the north chip 137-2 that comprises the routing table 145-2) issuing a read/write command from/to a MMIO address within or encompassed by the range of 0x4001 through 0x5000, the north chip 137-2 finds the MMIO bus address range 514 in the row 503 that encompasses the MMIO address specified by the read/write command and sends the read/write command to the device 160-3 that is connected via the Bus F to the bridge PTP C in the south chip D 143-2.

The example row 504 in the routing table 145-2 comprises data that indicates that the south chip 143-2 identified by the value "Chip D" in the south chip identifier field 510 comprises a PTP bridge identified by the value "PTP D" in the bridge identifier field 509 that is assigned a secondary bus identifier 511 of "Bus G," a subordinate bus identifier 512 of "Bus G," and an MMIO bus address range 514 of 0x6000-0x9FFF.

A device 160 is connected to the bridge 509 of "PTP D" via a bus whose bus identifier is encompassed by or falls within the range of bus identifiers specified by the secondary bus identifier 511 of "Bus G" and the subordinate bus identifier 512 of "Bus G." The bridge identified by the bridge identifier 509 of "PTP D" forwards configuration commands that specify a bus identifier encompassed by the range of the secondary bus identifier 511 of "Bus G" and the subordinate bus identifier 512 of "Bus G" to the buses, bridges, and devices that are downstream from the bridge "PTP D." The bridge identified by the bridge identifier 509 of "PTP D" forwards MMIO commands that specify an MMIO address encompassed by the MMIO bus address range 514 of 0x6000-0x9FFF to the buses, bridges, and devices that are downstream from the bridge "PTP D."

Thus, in response to the CPU 101-8 (in the same compute element 100-2 that comprises the north chip 137-2 that comprises the routing table 145-2) issuing a read/write command from/to a MMIO address within or encompassed by the range of 0x6000 through 0x9FFF, the north chip 137-2 finds the MMIO bus address range 514 in the row 504 that encompasses the MMIO address specified by the read/write command and sends the read/write command to the device 160-4 that is connected via the Bus G to the bridge PTP D in the south chip D 143-2.

Figure 6:
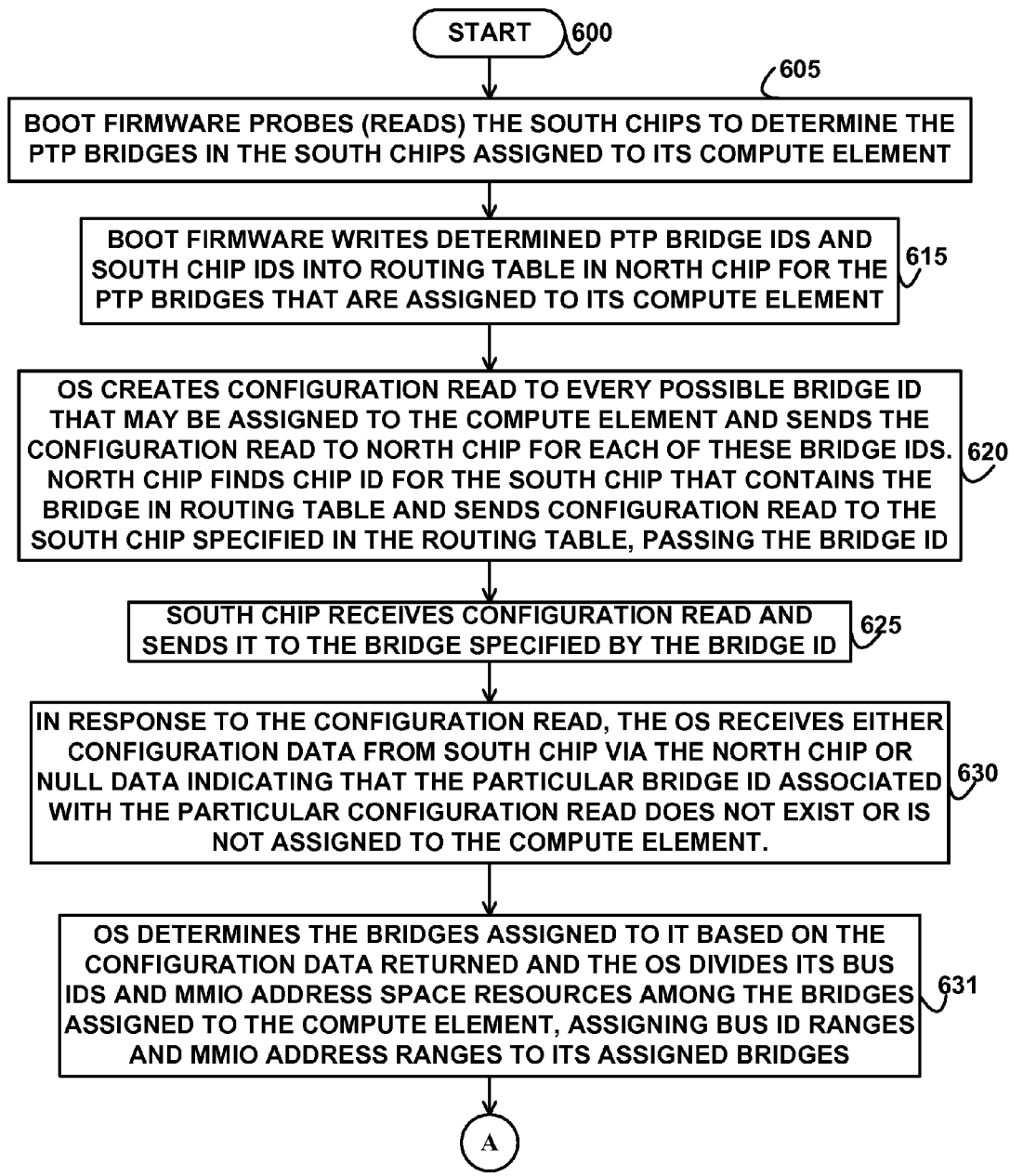
FIG. 6 depicts a flowchart of example processing for creating a routing table, according to an embodiment of the invention.

FIG. 6 depicts a flowchart of example processing for creating a routing table, according to an embodiment of the invention. The logic of FIG. 6 is performed for each boot firmware 107 in each compute element 100. Control begins at block 600.

Control then continues to block 605 where the boot firmware 107 in the compute element 100 probes (reads) the south chips 143 in all I/O elements 132 connected to the compute element 100 via the connection mesh fabric 155 and the gateways 195. The boot firmware 107 sends a request or command to all connected I/O elements 132 that requests data that describes the south chips 143 and the bridges contained in the south chips 143. In response, the south chips 143 sends to the boot firmware 107 the identifiers of the south chips 143 and bridge identifiers of the PTP bridges that are assigned to the compute element 100. A bridge being assigned to a compute element means that the compute element sends commands to the bridge and does not send commands to bridges that are not assigned to the compute element.

Control then continues to block 615 where the boot firmware 107 writes the determined bridge identifiers and south chip identifiers into the routing table 145 (e.g., into the fields 409 and 410 or 509 and 510) in the north chip 137 for the PTP bridges that are assigned to the compute element 100 that contains the boot firmware 107.

Control then continues to block 620 where the operating system 105-1, 105-2, 105-3, or 105-4 creates configuration read commands that specify every possible bridge identifier that may be assigned to the compute element 100 and sends the configuration read commands to the north chip 137. The north chip 137 receives the configuration read commands and, in response, finds the south chip identifier 410 or 510 for the south chip 143 that contains the specified bridge identifier in the same row in the routing table 145 and sends the configuration read commands to the identified south chip 143 specified in the same row in the routing table 145, passing the bridge identifier in the configuration read command.

Control then continues to block 625 where the south chip 143 receives the configuration read commands and, in response, sends the configuration read commands to the bridge specified by the bridge identifier in the configuration read commands.

Control then continues to block 630 where, in response to the configuration reads, the operating system 105-1, 105-2, 105-3, or 105-4 receives configuration data from the south chip 143 via the north chip 137. The configuration data comprises bridge identifiers that identify PTP bridges in the south chip 143 or null data, indicating that the particular bridge identifier associated with the particular configuration read does not exist or is not assigned to the compute element. In various embodiments, null data is represented by all binary 1's, all binary 0's, or any other appropriate value defined by the bus architecture or implementation.

Control then continues to block 631 where the operating system 105-1, 105-2, 105-3, or 105-4 determines the bridges assigned to it based on the returned configuration data. Null data returned for a configuration access to the bridge identifier specified by the configuration access, indicates that the specified bridge identifier is not assigned to the operating system. The operating system 105-1, 105-2, 105-3, or 105-4 divides its bus identifiers and MMIO address space resources among the bridges assigned to the compute element, assigning bus identifier ranges and MMIO address ranges to its assigned bridges. In an embodiment, the operating system 105-1, 105-2, 105-3, or 105-4 divides its bus identifiers by assigning bus identifiers to buses downstream from the bridges in the order in which the buses exist downstream from the bridges. In an embodiment, the operating system 105-1, 105-2, 105-3, or 105-4 assigns MMIO address ranges to the assigned bridges in proportion to the amount of memory in the devices that are connected to the bridges via the buses downstream from the bridges.

Figure 7:
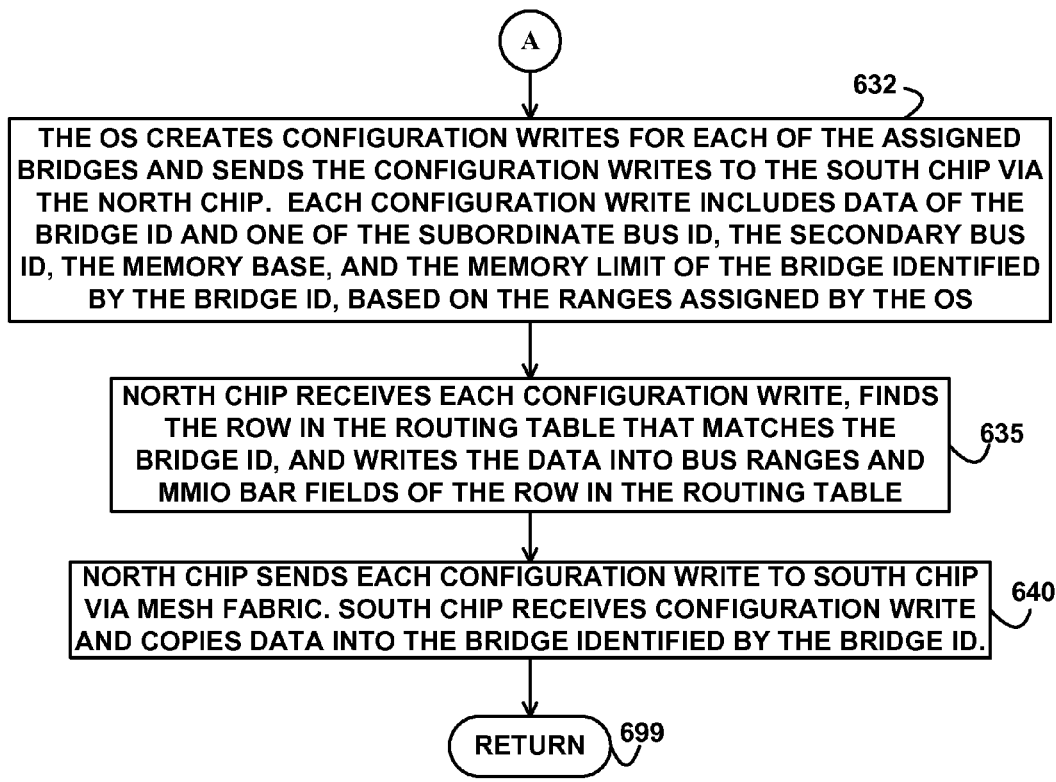
FIG. 7 depicts a flowchart of further example processing for creating the routing table, according to an embodiment of the invention.

Control then continues to block 632 of FIG. 7 where the operating system 105-1, 105-2, 105-3, or 105-4 creates configuration write commands for each of the assigned bridges and sends the configuration writes to the south chip 143 via the north chip 137. Each configuration write comprises an identifier of the south chip and data of the bridge identifier in the south chip and one of the subordinate bus identifier, the secondary bus identifier, the memory base, and the memory limit of the bridge identified by the bridge identifier, based on the ranges assigned by the operating system 105-1, 105-2, 105-3, or 105-4. Thus, in an embodiment, the operating system 105-1, 105-2, 105-3, or 105-4 creates a separate configuration write for each of the subordinate bus identifier, the secondary bus identifier, the memory base, and the memory limit. In another embodiment, one configuration write command includes all of the subordinate bus identifier, the secondary bus identifier, the memory base, and the memory limit.

Control then continues to block 635 where the north chip 137 receives each configuration write, finds the row in the routing table 145 with a value in its bridge identifier field 409 or 509 that matches the bridge identifier in the configuration command, and writes the data from the configuration write command into the secondary bus identifier fields 411 or 511 and the subordinate bus identifier fields 412 or 512, and the MMIO bus address range fields 414 or 514 of the same row in the routing table 145.

Control then continues to block 640 where the north chip 137 sends each configuration write command to the south chip 143 via the connection mesh fabric 155. The south chip 143 receives the configuration write command and stores the received data of the secondary bus identifier, the subordinate bus identifier, and the MMIO bus address range into the bridge identified by the bridge identifier in the configuration write command.

Control then continues to block 699 where the logic of FIGS. 6 and 7 returns.

Figure 8:
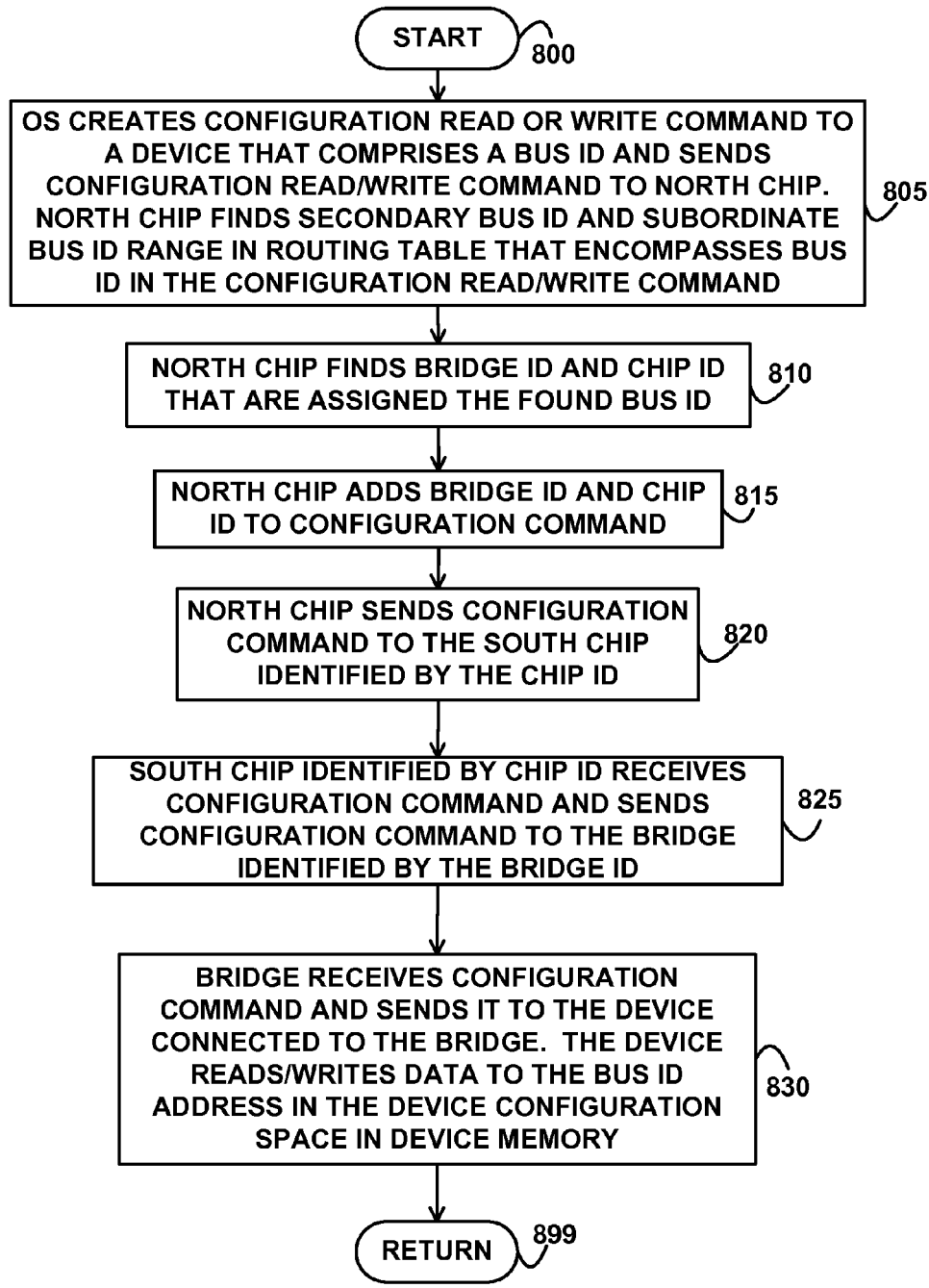
FIG. 8 depicts a flowchart of example processing for a configuration read/write command to a device, according to an embodiment of the invention.

FIG. 8 depicts a flowchart of example processing for a configuration read/write command to a device, according to an embodiment of the invention. Control begins at block 800.

Control then continues to block 805 where the operating system 105-1, 105-2, 105-3, or 105-4 creates a configuration read or write command to a device. The configuration read/write command comprises a bus identifier and optional data. The operating system 105-1, 105-2, 105-3, or 105-4 sends the configuration read/write command to the north chip 137. The north chip 137 finds the secondary bus identifier 411 or 511 and subordinate bus identifier 412 and 512 range in the routing table that encompasses the bus identifier in the configuration read/write command. The bus identifier in the configuration read/write command is encompassed by the secondary bus identifier 411 or 511 and subordinate bus identifier 412 and 512 if the command bus identifier is greater than or equal to the secondary bus identifier 411 or 511 and less than or equal to the subordinate bus identifier 412 or 512. The bus identifier in the configuration read/write command is not encompassed by the secondary bus identifier 411 or 511 and subordinate bus identifier 412 and 512 if the command bus identifier is less than the secondary bus identifier 411 or 511 or greater than the subordinate bus identifier 412 or 512.

Control then continues to block 810 where the north chip 137 finds the bridge identifier 409 or 509 and chip identifier 410 or 510 that are assigned the bus identifier of the configuration read/write command that was found to be encompassed by the secondary bus identifier 411 or 511 and the subordinate bus identifier 412 or 512 in the same row in the routing table 145.

Control then continues to block 815 where the north chip 137 adds the found bridge identifier and the found chip identifier to the configuration read/write command.

Control then continues to block 820 where the north chip 137 sends the configuration command to the south chip 143 that is identified by the chip identifier.

Control then continues to block 825 where the south chip 143 identified by the chip identifier receives the configuration command and sends the configuration command to the bridge identified by the bridge identifier.

Control then continues to block 830 where the bridge receives the configuration command and sends it to the device that is connected to the bridge. Bridges that detect the configuration command on their ingress ports compare the bus identifier in the configuration command to the secondary bus identifier and the subordinate bus identifier that are stored in the bridge. If the range specified by the secondary bus identifier and the subordinate bus identifier that are stored in the bridge encompasses the bus identifier in the configuration command, then the bridge forwards or sends the configuration command downstream to the bus connected to the egress port of the bridge. If the range specified by the secondary bus identifier and the subordinate bus identifier that are stored in the bridge does not encompass the bus identifier in the configuration command, then the bridge does not forward or send the configuration command downstream to the bus connected to the egress port of the bridge.

The device receives the configuration command, reads data from the address in the device configuration space in the device memory identified by the bus identifier in the read configuration command and sends the data to the operating system 105-1, 105-2, 105-3, or 105-4, or writes the data from the write configuration command to the address in the device configuration space in the device memory identified by the bus identifier in the write configuration command.

Control then continues to block 899 where the logic of FIG. 8 returns.

Figure 9:
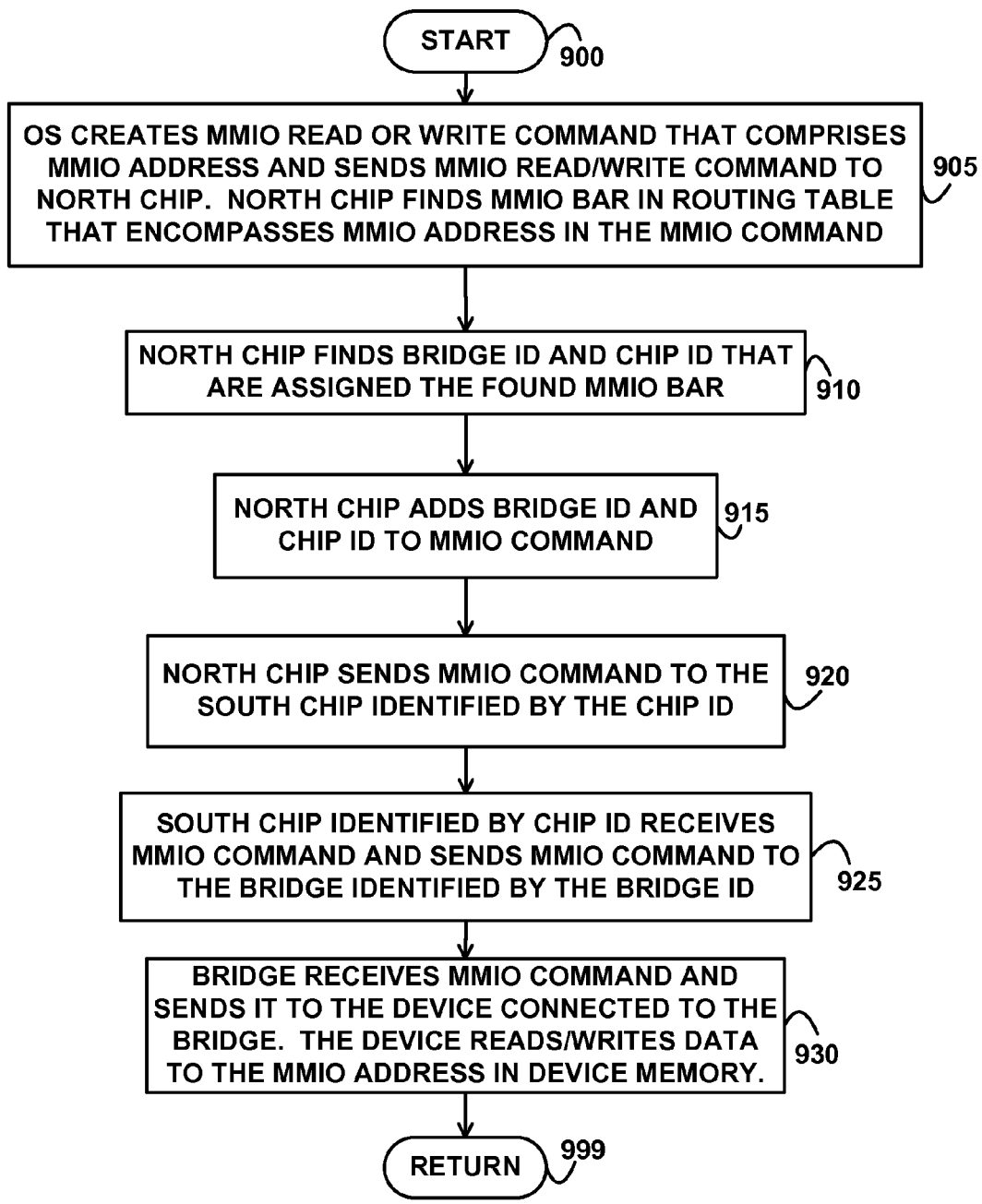
FIG. 9 depicts a flowchart of example processing for an MMIO command, according to an embodiment of the invention.

FIG. 9 depicts a flowchart of example processing for an MMIO command, according to an embodiment of the invention. Control begins at block 900.

Control then continues to block 905 where the operating system 105-1, 105-2, 105-3, or 105-4 creates an MMIO read or write command that comprises an MMIO address and sends the MMIO read/write command to the north chip 137. If the MMIO command is a write command, the MMIO command also comprises data to be written to a device 160 that is assigned a range of MMIO addresses that encompasses the MMIO address specified by the write command. If the MMIO command is a read command, the MMIO read command requests that data be read from the MMIO address at a device 160 that is assigned a range of MMIO addresses that encompasses the MMIO address specified by the read command.

The north chip 137 receives the MMIO command and, in response, finds a MMIO bus address range 414 or 514 in the routing table 145-1 or 145-2 that contains or encompasses the MMIO address of the MMIO command. The MMIO bus address range 414 or 514 in a row of the routing table 145-1 or 145-2 contains or encompasses the MMIO address if the MMIO address in the MMIO command is greater than or equal to the lower bound of the MMIO bus address range 414 or 514 and less than or equal to the upper bound of the MMIO bus address range 414 or 514, i.e., if the MMIO address is within the MMIO bus address range 414 or 514. If the MMIO address in the MMIO command is less than the lower bound of the MMIO bus address range 414 or 514 or greater than the upper bound of the MMIO bus address range 414 or 514, then the MMIO address in the MMIO command is not encompassed by and is not within the MMIO bus address range 414 or 514 of that row in the routing table 145-1 or 145-2.

Control then continues to block 910 where the north chip 137 finds the bridge identifier 409 or 509 and south chip identifier 410 or 510 that are assigned the found MMIO bus address range 414 or 514 in the same row of the routing table 145-1 or 145-2.

Control then continues to block 915 where the north chip 137 adds the found bridge identifier 409 or 509 and the found south chip identifier 410 or 510 to the MMIO command.

Control then continues to block 920 where the north chip 137 sends the MMIO command that comprises the found bridge identifier and the found south chip identifier to the south chip 143 that is identified by the found south chip identifier.

Control then continues to block 925 where the south chip 143 identified by the south chip identifier in the MMIO command receives the MMIO command and sends the MMIO command to the bridge identified by the bridge identifier in the MMIO command.

Control then continues to block 930 where the bridge receives the MMIO command and sends it to the device connected to the bridge. Bridges that detect the MMIO command on their ingress ports compare the MMIO address in the MMIO command to the MMIO bus address range that is stored in the bridge. If the MMIO bus address range that is stored in the bridge encompasses the MMIO address in the MMIO command, then the bridge forwards or sends the MMIO command downstream to the bus connected to the egress port of the bridge. If the MMIO bus address range that is stored in the bridge does not encompasses the MMIO address in the MMIO command, then the bridge does not forward or send the MMIO command downstream to the bus connected to the egress port of the bridge.

The device receives the MMIO command and, in response, reads/writes data from/to the MMIO address location specified by the MMIO command in the memory 102-3 in the device 160.

Control then continues to block 999 where the logic of FIG. 9 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A non-transitory computer-readable storage medium encoded with instructions, wherein the instructions when executed comprise:

receiving, at a north chip, a secondary bus identifier that identifies a bus that is immediately downstream from a bridge, a subordinate bus identifier that identifies a highest bus identifier of all of buses reachable downstream of the bridge, and an MMIO bus address range that comprises a memory base and a memory limit;

in response to the receiving, writing, to the north chip, a translation of a bridge identifier that identifies the bridge and a south chip identifier that identifies a south chip that comprises the bridge to the secondary bus identifier, the subordinate bus identifier, and the MMIO bus address range;

sending the secondary bus identifier, the subordinate bus identifier, the memory base, and the memory limit to the bridge, wherein the bridge stores the secondary bus identifier, the subordinate bus identifier, the memory base, and the memory limit in the bridge;

receiving, at the north chip, an MMIO command that comprises an MMIO address;

in response to the receiving the MMIO command, finding in the translation the MMIO bus address range that encompasses the MMIO address;

in response to the finding in the translation the MMIO bus address range that encompasses the MMIO address, determining the bridge identifier and the south chip identifier that are assigned the MMIO bus address range that encompasses the MMIO address;

adding the bridge identifier and the south chip identifier that are assigned the MMIO bus address range that encompasses the MMIO address to the MMIO command;

sending the MMIO command to the south chip identified by the chip identifier; and wherein if the MMIO bus address range that is stored in the bridge encompasses the MMIO address in the MMIO command, then the bridge sends the MMIO command downstream to a bus connected to an egress port of the bridge, and wherein if the MMIO bus address range that is stored in the bridge does not encompass the MMIO address in the MMIO command, then the bridge does not send the MMIO command downstream to the bus connected to the egress port of the bridge.

2. The non-transitory computer-readable storage medium of claim 1, wherein the receiving the secondary bus identifier, the subordinate bus identifier, and the MMIO bus address range further receives the secondary bus identifier, the subordinate bus identifier, and the MMIO bus address range via a plurality of configuration write commands received from an operating system and wherein the sending the secondary bus identifier, the subordinate bus identifier, the memory base, and the memory limit to the bridge further sends the secondary bus identifier, the subordinate bus identifier, the memory base, and the memory limit to the south chip via the plurality of configuration write commands.

3. The non-transitory computer-readable storage medium of claim 2, further comprising:

receiving, at the north chip, a first configuration command that comprises a bus identifier, wherein the receiving the first configuration command receives the configuration command from the operating system; and in response to the receiving the first configuration command, finding the secondary bus identifier and the subordinate bus identifier in the translation that encompass the bus identifier of the first configuration command.

4. The non-transitory computer-readable storage medium of claim 3, further comprising:

in response to the finding the secondary bus identifier and the subordinate bus identifier in the translation that encompass the bus identifier of the first configuration command, finding the bridge identifier and the chip identifier in the translation that are assigned to the secondary bus identifier and the subordinate bus identifier that encompass the bus identifier of the first configuration command.

5. The non-transitory computer-readable storage medium of claim 4, further comprising:

in response to the finding the bridge identifier and the chip identifier in the translation that are assigned to the secondary bus identifier and the subordinate bus identifier that encompass the bus identifier of the first configuration command, adding the bridge identifier and the south chip identifier to the first configuration command; and sending the first configuration command to the south chip identified by the south chip identifier in the first configuration command.

6. The non-transitory computer-readable storage medium of claim 5, wherein the bridge in the south chip compares the bus identifier in the first configuration command to the secondary bus identifier and the subordinate bus identifier that are stored in the bridge, wherein if the secondary bus identifier and the subordinate bus identifier that are stored in the bridge encompass the bus identifier in the first configuration command, then the bridge sends the first configuration command downstream to a bus connected to the egress port of the bridge, and wherein if the secondary bus identifier and the subordinate bus identifier that are stored in the bridge do not encompass the bus identifier in the first configuration command, then the bridge does not send the first configuration command downstream to the bus connected to the egress port of the bridge.

7. The non-transitory computer-readable storage medium of claim 1, wherein the all of the buses reachable downstream of the bridge are connected indirectly to the bridge through another bridge.

8. A computer comprising:

an input/output element comprising a south chip, wherein the south chip comprises a bridge; and a compute element comprising a north chip, wherein the compute element is connected to the input/output element via a connection mesh fabric, wherein the north chip receives a secondary bus identifier that identifies a bus that is immediately downstream from the bridge, a subordinate bus identifier that identifies a highest bus identifier of all of buses reachable downstream of the bridge, and an MMIO bus address range that comprises a memory base and a memory limit, in response to the receive of the secondary bus identifier, the north chip writes, to the north chip, a translation of a bridge identifier that identifies the bridge and a south chip identifier that identifies the south chip that comprises the bridge to the secondary bus identifier, the subordinate bus identifier, and the MMIO bus address range, wherein the north chip sends the secondary bus identifier, the subordinate bus identifier, the memory base, and the memory limit to the bridge, wherein the bridge stores the secondary bus identifier, the subordinate bus identifier, the memory base, and the memory limit in the bridge, wherein the north chip receives an MMIO command that comprises an MMIO address, in response to the receive of the MMIO command, the north chip finds in the translation the MMIO bus address range that encompasses the MMIO address, in response to the find in the translation of the MMIO bus address range that encompasses the MMIO address, the north chip determines the bridge identifier and the south chip identifier that are assigned the MMIO bus address range that encompasses the MMIO address, wherein the north chip adds the bridge identifier and the south chip identifier that are assigned the MMIO bus address range that encompasses the MMIO address to the MMIO command, wherein the north chip sends the MMIO command to the south chip identified by the chip identifier, and wherein if the MMIO bus address range that is stored in the bridge encompasses the MMIO address in the MMIO command, then the bridge sends the MMIO command downstream to a bus connected to an egress port of the bridge, and wherein if the MMIO bus address range that is stored in the bridge does not encompass the MMIO address in the MMIO command, then the bridge does not send the MMIO command downstream to the bus connected to the egress port of the bridge.

9. The computer of claim 8, wherein the receive of the secondary bus identifier, the subordinate bus identifier, and the MMIO bus address range further receives the secondary bus identifier, the subordinate bus identifier, and the MMIO bus address range via a plurality of configuration write commands received from an operating system and wherein the send of the secondary bus identifier, the subordinate bus identifier, the memory base, and the memory limit to the bridge further sends the secondary bus identifier, the subordinate bus identifier, the memory base, and the memory limit to the south chip via the plurality of configuration write commands.

10. The computer of claim 9, wherein the north chip further receives a first configuration command that comprises a bus identifier, wherein the receive of the first configuration command receives the configuration command from the operating system, and in response to the receive of the first configuration command, the north chip finds the secondary bus identifier and the subordinate bus identifier in the translation that encompass the bus identifier of the first configuration command.

11. The computer of claim 10, wherein in response to the find of the secondary bus identifier and the subordinate bus identifier in the translation that encompass the bus identifier of the first configuration command, the north chip finds the bridge identifier and the chip identifier in the translation that are assigned to the secondary bus identifier and the subordinate bus identifier that encompass the bus identifier of the first configuration command.

12. The computer of claim 11, wherein in response to the find of the bridge identifier and the chip identifier in the translation that are assigned to the secondary bus identifier and the subordinate bus identifier that encompass the bus identifier of the first configuration command, the north chip adds the bridge identifier and the south chip identifier to the first configuration command, and wherein the north chip sends the first configuration command to the south chip identified by the south chip identifier in the first configuration command.

13. The computer of claim 12, wherein the bridge in the south chip compares the bus identifier in the first configuration command to the secondary bus identifier and the subordinate bus identifier that are stored in the bridge, wherein if the secondary bus identifier and the subordinate bus identifier that are stored in the bridge encompass the bus identifier in the first configuration command, then the bridge sends the first configuration command downstream to a bus connected to the egress port of the bridge, and wherein if the secondary bus identifier and the subordinate bus identifier that are stored in the bridge do not encompass the bus identifier in the first configuration command, then the bridge does not send the first configuration command downstream to the bus connected to the egress port of the bridge.

14. The computer of claim 8, wherein the all of the buses reachable downstream of the bridge are connected indirectly to the bridge through another bridge.

* * * * *